(12) United States Patent
Tabuchi et al.

(10) Patent No.: US 6,705,181 B2
(45) Date of Patent: Mar. 16, 2004

(54) TORQUE TRANSMISSION APPARATUS

(75) Inventors: Yasuo Tabuchi, Toyoake (JP); Junichi Ohguchi, Toyoake (JP); Naoki Hakamada, Anjo (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 10/158,931

(22) Filed: Jun. 3, 2002

(65) Prior Publication Data

US 2002/0189393 A1 Dec. 19, 2002

(30) Foreign Application Priority Data

Jun. 14, 2001 (JP) ......................................... 2001-180053

(51) Int. Cl.[7] .............................. G05G 3/00; F16F 15/10; F04B 49/00
(52) U.S. Cl. .................. 74/573 R; 74/574; 74/572; 417/223; 417/222.1; 464/87; 464/76; 464/73; 464/85; 92/70; 192/84.941; 192/209; 192/30 V
(58) Field of Search ................. 74/572–574; 417/223, 417/222.1; 188/378; 92/70; 464/87, 73, 76, 85; 192/84.941, 30 V, 205

(56) References Cited

U.S. PATENT DOCUMENTS

| 5,697,261 | A | * | 12/1997 | Mokdad et al. ........... 74/573 R |
| 6,089,121 | A | * | 7/2000 | Lohaus ........................ 74/574 |
| 6,129,194 | A | * | 10/2000 | Booth et al. ........... 192/84.941 |
| 6,244,134 | B1 | * | 6/2001 | Sudau ........................ 74/574 |
| 2002/0052242 | A1 | * | 5/2002 | Tabuchi et al. ............. 464/87 |
| 2002/0146326 | A1 | * | 10/2002 | Kawaguchi et al. ........ 417/223 |
| 2003/0000377 | A1 | * | 1/2003 | Kawata et al. ................ 92/70 |
| 2003/0000783 | A1 | * | 1/2003 | Kanai et al. ................ 188/378 |
| 2003/0002991 | A1 | * | 1/2003 | Kawata et al. ........... 417/222.1 |
| 2003/0012661 | A1 | * | 1/2003 | Kawata et al. .............. 417/223 |
| 2003/0037636 | A1 | * | 2/2003 | Kawata et al. ................ 74/574 |

FOREIGN PATENT DOCUMENTS

| EP | 000999546 A1 | * | 5/2000 | ............... 74/573 R |
| JP | A-5-302648 | | 11/1993 | |
| JP | A-2000-297844 | | 10/2000 | |

OTHER PUBLICATIONS

U.S. patent application Ser. No. 09/977356, Tabuchi et al., filed Oct. 16, 2001.

*Mechanical Engineering Handbook*, pp. 3–48 —3–49, (Discussed on p. 8 of the spec.).

* cited by examiner

Primary Examiner—Vinh T. Luong
(74) Attorney, Agent, or Firm—Posz & Bethards, PLC

(57) ABSTRACT

A torque transmission apparatus absorbs torque fluctuations (vibrations) while limiting the size of the outside dimensions of a pulley. Elastomeric dampers and pendulum type vibration-absorbing mechanisms are located between an outer tube and an inner tube of a pulley body.

7 Claims, 8 Drawing Sheets

TORQUE TRANSMISSION APPARATUS

CROSS REFERENCE TO RELATED APPLICATION

This application relates to and incorporates by reference Japanese patent application no. 2001-180053, which was filed on Jun. 14, 2001.

BACKGROUND OF THE INVENTION

The present invention relates to a torque transmission apparatus for transmitting torque from a driving source to a rotating device, and in particular to a torque transmission apparatus (pulley) that transmits torque from an engine to rotating devices (auxiliary machines), such as an alternator or a compressor in a vehicle engine compartment.

The applicant filed a patent application for a pulley (Japanese Patent Application No. 2001-120161) with a built-in rubber damper for absorbing torque fluctuations. However, when the torque fluctuations are to be absorbed by only the rubber damper, the pulley must to be larger, because a larger damper is required for larger torque fluctuations.

SUMMARY OF THE INVENTION

The present invention was made in view of the above-mentioned problem, and it is an object of the invention to absorb torque fluctuations (vibration), while limiting the outside dimensions of the torque transmission apparatus.

To achieve the above-mentioned object, according to a first aspect of the present invention, a torque transmission apparatus for transmitting torque from a driving source to a rotating device includes a first rotating member, which has a dual tubular form. The first rotating member includes an inner tube and an outer tube, which are coaxial. The outer tube receives torque from one of the driving source and the rotating device. A bearing is located inside the inner tube, for supporting the first rotating member. A second rotating member is connected to the other of the rotating device and the driving source. An elastically deformable torque transmission member is located between the inner tube and the outer tube, for transmitting the torque between the first rotating member and the second rotating member. A pendulum type vibration-absorbing mechanism is located between the inner tube and the outer tube for canceling an exciting force generated corresponding to a rotational movement of both of the rotating members. The mechanism includes a movable weight.

With this apparatus, it is possible to absorb torque fluctuations (exciting force, vibration) sufficiently, while reducing the outside dimension of the torque transmission apparatus, in comparison to an apparatus in which the torque fluctuations (exciting force, vibration) are absorbed only by an elastically deformable torque transmission member.

It is preferred that the vibration-absorbing mechanism be constituted by fitting the weight into a hole formed between the inner tube and the outer tube. The center of gravity of the weight is offset from the center of area of a section of the hole.

An annular portion, which is provided with an engaging member for engaging the torque transmission member, is formed on the second rotating member, and the hole is blocked by the annular portion. Thus, escape of the weight portion from the hole is prevented.

In addition, escape-preventing means for preventing the weight portion from falling out of the hole may be provided on the torque transmission member adjacent to the hole.

The cross sectional shape of the space occupied by the weight is roughly the same as a shape that is a combination of the hole shape of a first opening and the hole shape of a second opening. The first opening is an opening of the hole at one end of the hole, and the second opening is an opposite opening.

With this arrangement, it is possible to easily form escape-preventing means, such as a wall portion for preventing the weight portion from falling out of the hole, integrally at both ends in the axial direction of the hole.

A sheathing film made of resin may be provided on an outer wall of the weight portion that faces an inner wall of the hole.

This reduces noise created when the weight portion collides with the inner wall of the hole.

DETAILED DESCRIPTION OF THE PREFERRED EMBODIMENTS (First Embodiment)

Figure 1:
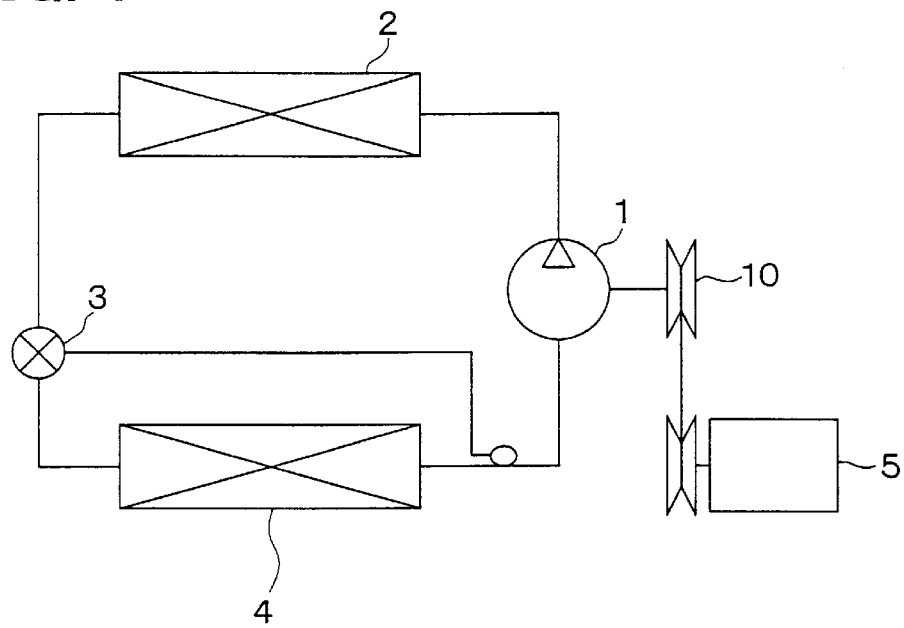
FIG. 1 is a schematic view of an air conditioner according to a first embodiment of the present invention.

The first embodiment is an application of the present invention to a torque transmission apparatus that transmits a power of a driving engine to a compressor of a vehicle air conditioner. FIG. 1 is a schematic view of the air conditioner for a vehicle (refrigeration circuit).

In FIG. 1, reference numeral 1 denotes a compressor that draws and compresses refrigerant, and reference numeral 2 denotes a radiator (condenser) that cools (condenses) the refrigerant discharged from the compressor 1. Reference numeral 3 denotes a decompressor that decompresses the refrigerant that has exited from the radiator 2, and reference numeral 4 denotes an evaporator that cools by evaporating the refrigerant that has been decompressed by the decompressor 3.

In this embodiment, a thermostatic expansion valve is adopted for the decompressor 3, and the opening of the thermostatic expansion valve is adjusted, so that the refrigerant at the exit side of the evaporator 4 (the refrigerant at the suction side of the compressor 1) has a prescribed degree of superheat.

Reference numeral 10 denotes a torque transmission apparatus integrally formed with a pulley, which is referred to simply as the pulley 10 herein. The pulley 10 transmits the power of the engine, which is transmitted thereto through the intervention of a V-belt (not shown), to the compressor 1. The pulley will be described in the following.

Reference numeral 11 denotes a pulley main body (first rotating member) made of resin (phenol resin in this embodiment), which is rotated by torque from a driving source (engine 5). The main body 11 is made in a dual tubular form and has a generally annular outer tube 11b and a generally annular inner tube 11c. The outer tube 11b has V-shaped grooves 11a, and a (polydrive type) V-belt is wrapped around the outer tube 11b. The inner tube 11c is coaxially located within the outer tube 11b.

A radial bearing 12, which is press fitted inside the inner tube 11c, supports the pulley main body 11 (pulley 10). A metal sleeve 11d (iron-based metal such as SPCC in this embodiment) is integrally formed with the pulley main body 11 (inner tube 11c) by insert molding at the inner part of the inner tube 11c, where the bearing 12 is located. The metal sleeve 11d prevents stress in excess of a tolerated value from being generated in the pulley main body 11 (inner tube 11c), when press fitting the bearing 12.

In this embodiment, the radial load due to the weight of the pulley 10 itself and the tension of the V-belt is received by a front housing member (not shown) of the compressor 1 by press fitting the inner race of the bearing 12 to the front housing member of the compressor 1.

Reference numeral 13 denotes a center hub (second rotating member) that is linked to a shaft of the compressor 1, and the center hub rotates with the shaft. The center hub 13 is coupled to the outer surface of the shaft by splines (refer to JIS D 2001, or the like). The center hub 13 includes the following: a boss 13a, which is provided on the same axis as the pulley main body 11; an annular outer portion 13c, which includes a plurality of protrusions (latch portions) 13b to receive the torque supplied by the pulley main body 11; and a bridge portion 13d, which mechanically links the annular portion 13c and the boss 13a for transmitting torque from the annular portion 13c to the boss 13a.

The bridge portion 13d is configured to break when the torque transmitted from the annular portion 13c to the boss 13a exceeds a prescribed value. Thus, the bridge portion 13d serves, in this embodiment, as a torque limiting mechanism that regulates the maximum torque transmitted from the engine 5 to the compressor 1.

In this embodiment, the boss 13a and the bridge portion 13d are integrally molded with metal, and the annular portion 13c is molded with resin. The bridge portion 13d and the annular portion 13c are united by an insert molding method.

Figure 3:
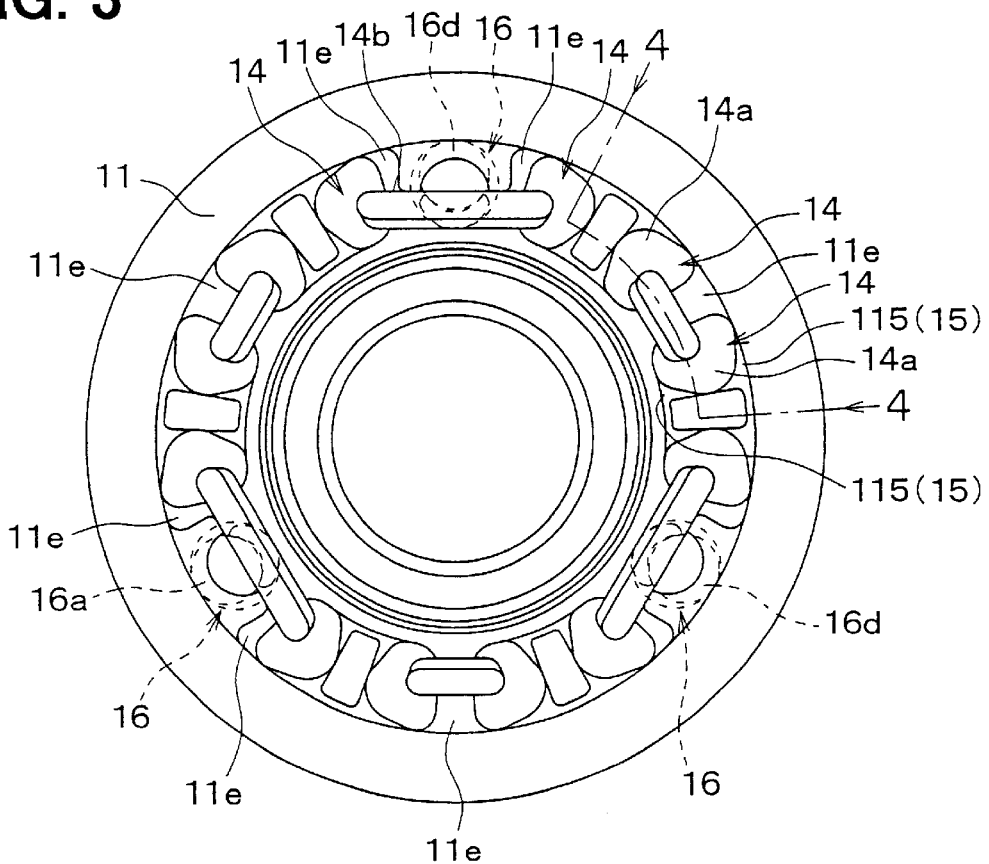
FIG. 3 is a front view of the pulley of FIG. 1 with the center hub removed.
Figure 4:
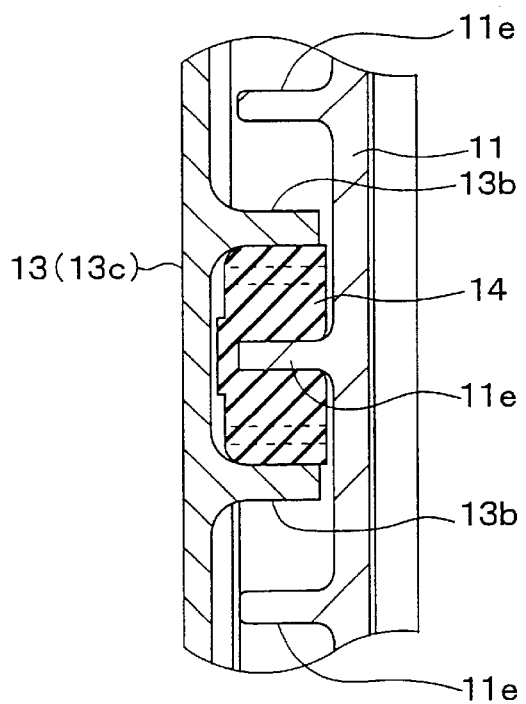
FIG. 4 is a sectional view taken along the line 4—4 in FIG. 3.

A plurality of protrusions 11e are integrally formed on the pulley main body 11 at a location corresponding to the annular portion 13c, as shown in FIG. 3 and 4. The protrusions 11e extend from the pulley main body 11 towards the annular portion 13c (center hub 13). When the pulley main body 11 and the center hub 13 are installed on the compressor 1, the protrusions 13b of the center hub 13 and the protrusions 11e of the pulley main body 11 are opposed and interdigitated, as shown in FIG. 4, and dampers 14 are located between them.

The dampers 14 are made of material capable of elastic deformation (EPDM (ethylene-propylene-diene terpolymer rubber) in this embodiment). Each damper 14 is arranged between an adjacent pair of protrusions made up of one of the hub protrusions 13b one of the body protrusions 11e, and the dampers 14 thus transmit torque received by the pulley main body 11 to the center hub 13.

Each damper 14 is generally triangular, as shown in FIG. 3, so that a gap 15 is formed between the damper 14 and an inner surface 11g of the body 11 (refer to FIG. 5), when there is no compressive load on the damper 14. The inner surfaces 11g are on the inner walls of the space 11f accommodating the dampers 14, and the inner surfaces are generally parallel to the direction of the compressive load. The triangular form is achieved by tapering an end 14a of the damper 14 that extends generally in the direction of the compressing load acting upon the damper 14 (the circumferential direction), such that its cross sectional area decreases.

Figure 5:
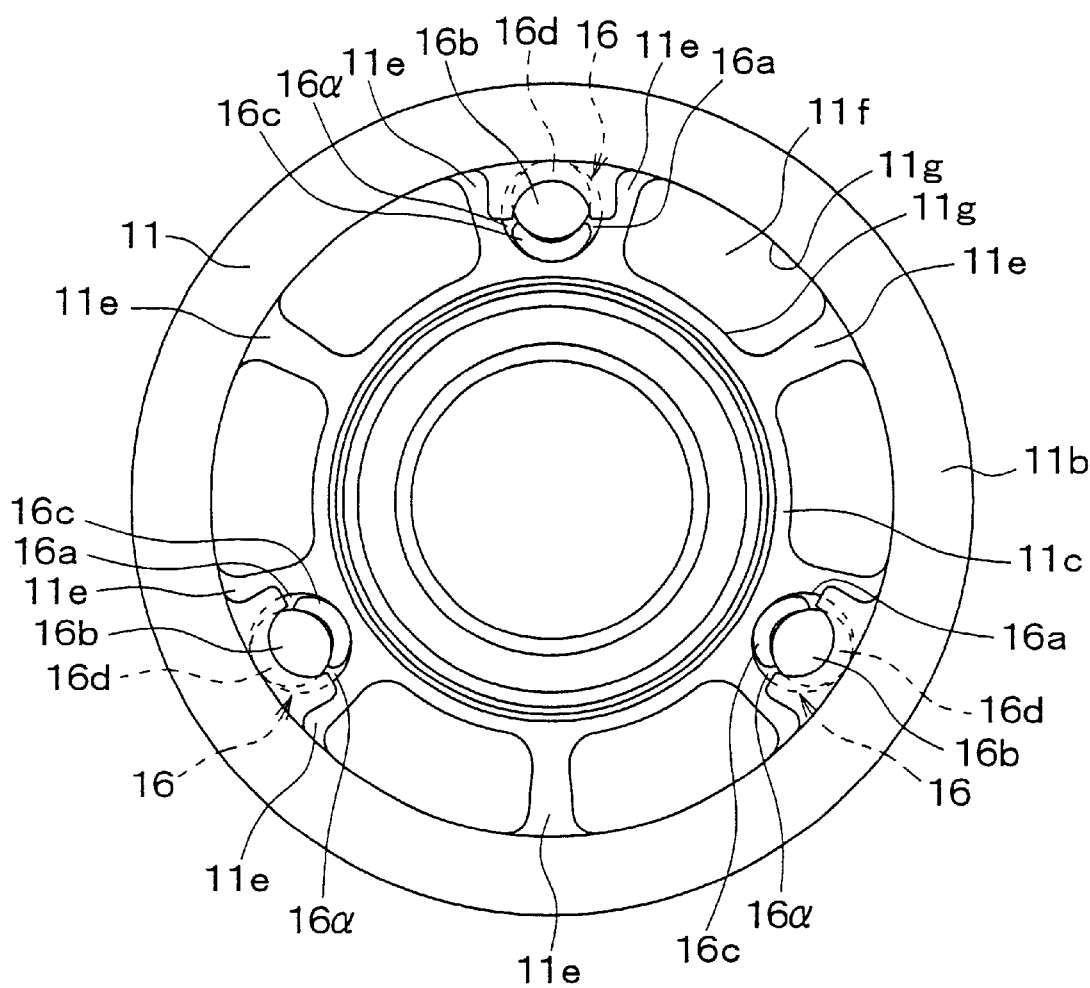
FIG. 5 is a front view of a pulley main body according to the first embodiment.

FIG. 5 is a front view of the pulley main body 11 showing a state in which the dampers 14 have been removed from, the pulley main body 11. There are pendulum type vibration-absorbing mechanisms 16 at three locations between the inner tube 11c and the outer tube 11b that cancel radial vibration, which is generated by the rotating movement of the pulley main body 11 and the center hub 13.

Each vibration-absorbing mechanism 16 cancels vibrations by oscillating a weight 16b so that a centrifugal force in the opposite direction of the exciting force is applied, as described in a mechanical engineering handbook, for example.

To be specific, the center of gravity of each weight 16b is offset from the center of a hole 16a, in a resting state. This is done by forming a few (three, for example) generally cylindrical holes 16a between the inner tube 11c and the outer tube 11b, and inserting generally cylindrical weights 16b into the holes 16a. The inner diameter of the holes 16a is greater than the outer diameter of the weights 16b as shown.

The center of area of a section, as is well known, is the point where the moment of area is balanced in a plane figure, and in this embodiment, the center of area of the hole 16a is its center, because the sectional shape of the hole 16a is a circle.

The axis of the hole 16a and the axis of the weight 16b are parallel to the axis of the pulley main body 11 and the axis of the center hub 13 (boss 13a). A crescent-shaped retainer 16c is located inside the hole 16a between the weight 16b and the inner wall of the hole 16a. The retainer 16c rotates (oscillates) inside the hole 16a in unison with the weight 16b, to prevent the weight 16b from colliding with the inner wall of the hole 16a due to gravity when the rotation of the pulley 10 is stopped.

Figure 2:
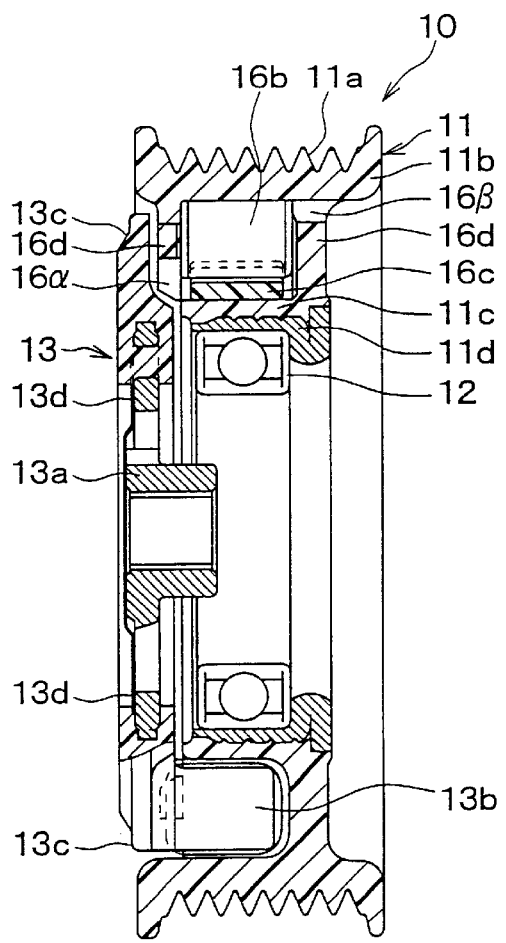
FIG. 2 is a sectional view of a pulley according to a first embodiment of the present invention.
Figure 6:
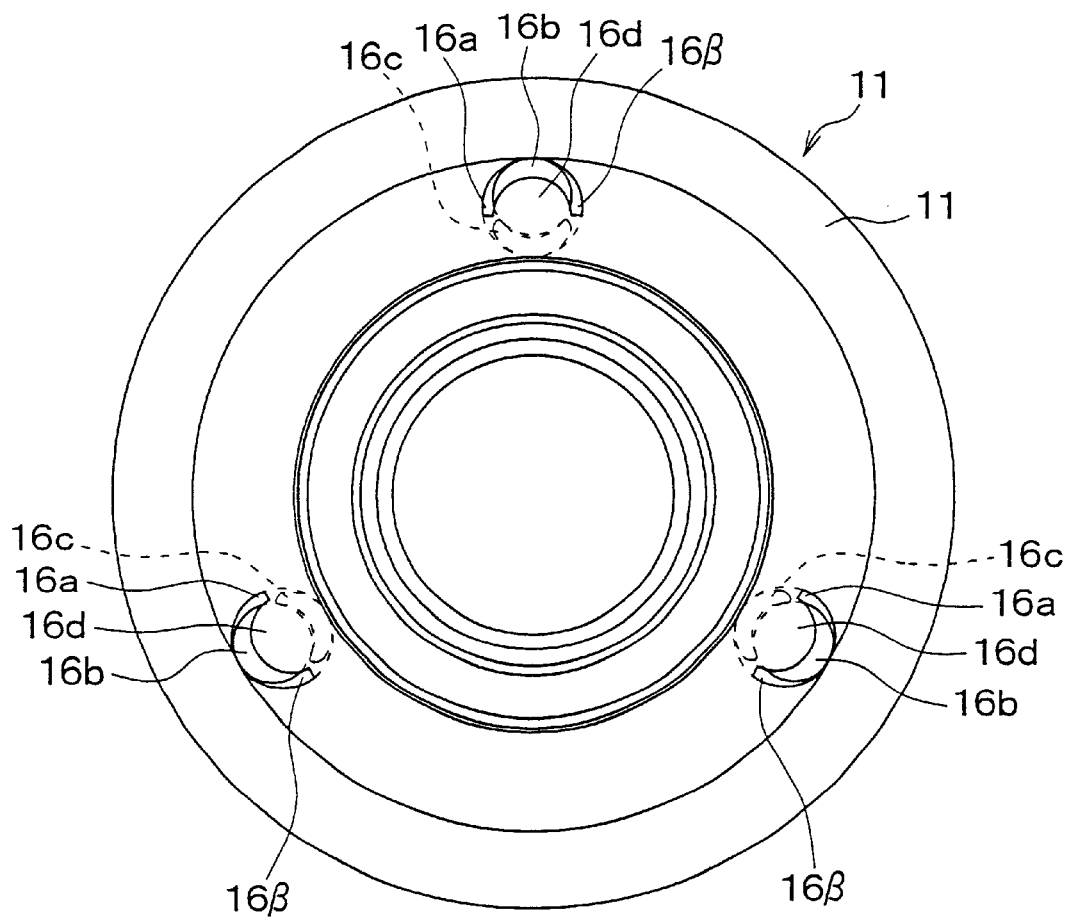
FIG. 6 is a right side view of the pulley of FIG. 2.
Figure 7:
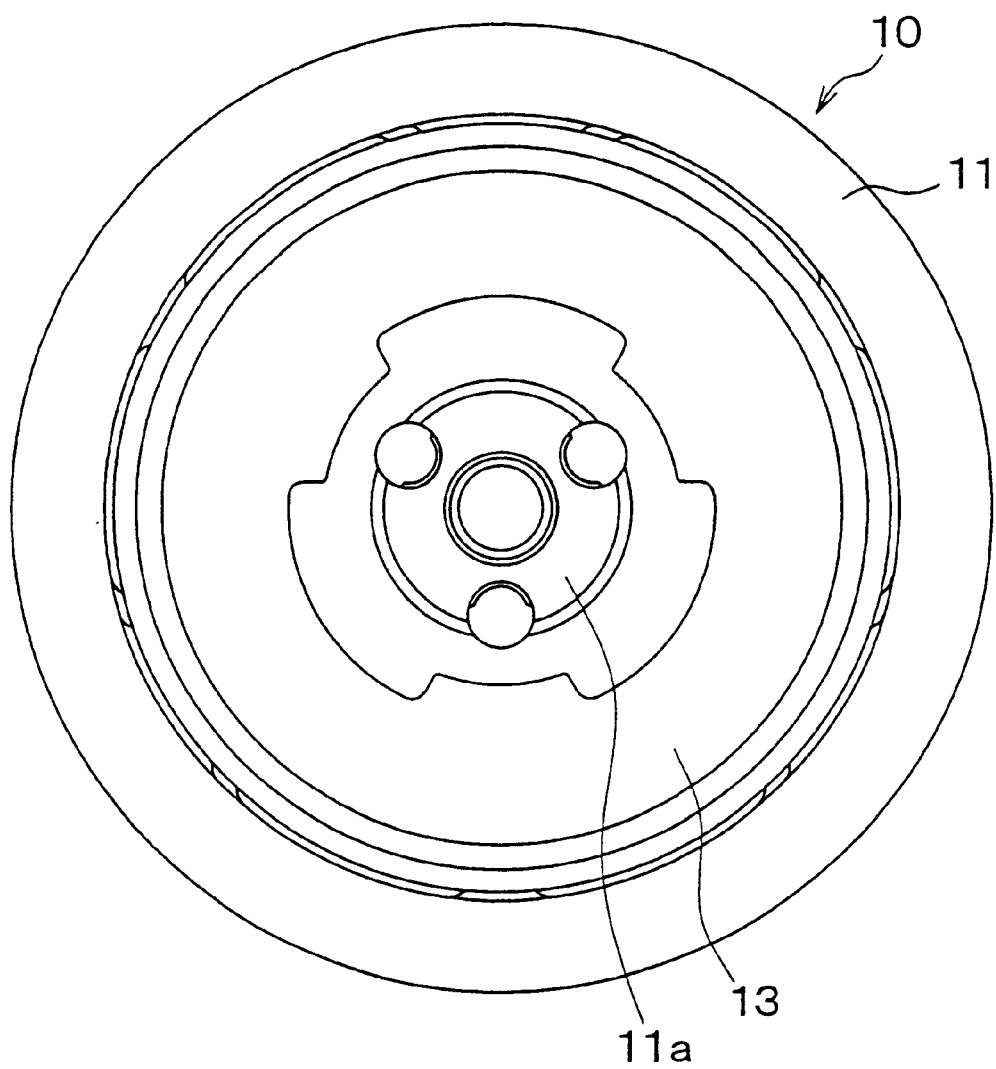
FIG. 7 is a left side view of the pulley of FIG. 2.

An opening on one side (left side in FIG. 2) of the pulley main body 11 is referred to as a first opening 16α, and an opening on the opposite side is referred to as a second opening 16β (refer to FIG. 6). The first opening 16α is obstructed by the annular portion 13c of the center hub 13, as shown in FIGS. 2 and 7. Escape of the weights 16b from the holes 16a is prevented by providing a bridge (escape-preventing means) 14b, which connects the two dampers 14 that are adjacent to the hole 16a, as shown in FIG. 3.

In this embodiment, walls 16d, which also prevent the weight 16b from escaping from the hole 16a are integrally formed with the pulley main body 11 at both ends of each hole 16a, as shown in FIG. 5 and 6.

Operation of the pulley 10 according to this embodiment and its effects will be described next. When torque from the engine 5 is transmitted to the pulley main body 11 through the V-belt, the torque is further transmitted to the center hub 13 through the dampers 14, and the shaft of the compressor 1 rotates. In this state, torque fluctuations are absorbed by elastic deformation of the dampers 14.

In this embodiment, gaps 15 are formed between the inner wall 11g of the space 11f and the dampers 14 when there is no compressive load on the damper 14. Thus, when the relative rotating angle θ of the pulley main body 11 to the center hub 13 is smaller than a prescribed rotating angle θ1, the dampers 14 deform by compression, and the cross sectional area of a section of each damper 14 that is roughly orthogonal to the direction of the compressing load increases. When the relative rotating angle θ of the pulley main body 11 to the center hub 13 is equal or greater than the prescribed rotating angle θ1, each damper 14 deforms by compression, and the corresponding increase in the cross sectional area of each damper is limited by the space 11f (inner wall 11g).

When the dampers 14 deform by compression and when their cross sectional areas can increase, there is more freedom in deformation, in comparison to a case in which the sectional areas are limited by the space 11f (inner wall 11g). Hence, the rate of change of the compressive load (torque) in regard to the relative rotating angle θ (this rate of change will be called the elastic modulus k, hereinafter) when the cross sectional area of the dampers 14 can increase under compression is smaller than the elastic modulus k that occurs when the sectional area of the dampers 14 is restricted from increasing by the walls 11g.

Consequently, when the relative rotating angle θ is smaller than the prescribed rotating angle θ1, each damper 14 is deformed by compression such that the area of contact each damper makes with the walls 11g increases when the relative rotating angle θ increases. Thus, the dampers 14 have a characteristic (a non linear characteristic) that the elastic modulus k of the dampers 14 increases when the relative rotating angle θ (torque) increases.

Therefore, when the transmitted torque is relatively small, it is possible to absorb torque fluctuations (vibrations in the rotating direction), because the elastic modulus k is small. When the transmitted torque is relatively large, it is possible to transmit the torque without rupturing the dampers 14, because the elastic modulus k becomes greater.

Figure 8A:
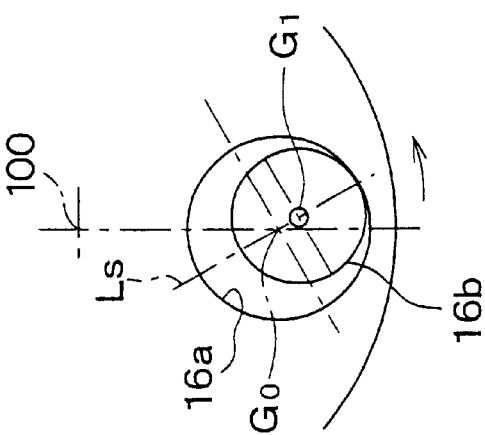
FIGS. 8A, 8B, and 8C are explanatory diagrams illustrating the operation of the vibration-absorbing mechanism according to the first embodiment.
Figure 8B:
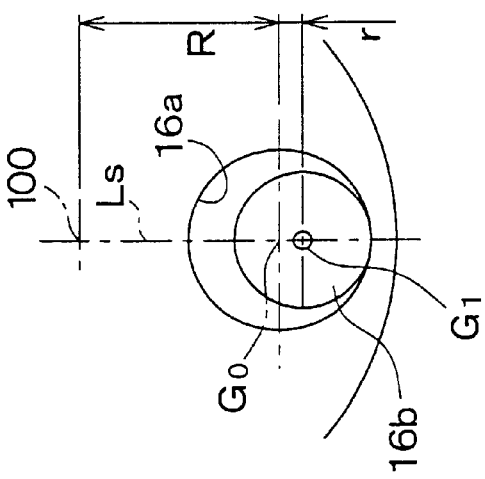
Figure 8C:
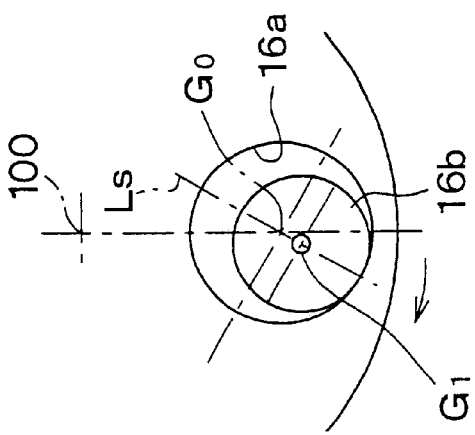

Referring to FIGS. 8A, 8B and 8C, the center of gravity of each weight 16b is offset from the center of area of the hole 16a, and each weight 16b is fitted into the corresponding hole 16a such that each weight can slide in the circumferential direction of the hole 16a, and the axis of each weight 16b being roughly horizontal. Hence, a restoring force acts upon the weight 16b by the centrifugal force acting upon the weight 16b to make the pendulum line Ls vertical. Here, the pendulum line Ls connects the center of area G0 and the center of gravity G1.

On the other hand, since the hole 16a rotates in unison with the pulley main body 11, the weight 16b oscillates around the center of area G0 with a vibration frequency proportional to an integral multiplication of $(R/r)^{1/2}$, which is well known (refer to a mechanical engineering handbook, or the like). Therefore, it is possible to cancel the vibration (exciting force) in the radial direction acting upon the pulley 10 with a centrifugal force acting upon the weight 16b by making R (the distance from the rotating center 100 of the pulley 10 to the center of area G0) and r (the distance between the center of area G0 and the center of gravity G1) appropriate dimensions. Therefore, it is possible to absorb torque fluctuations (exciting force, vibration) while limiting the outer dimension of the pulley.

The manufacturing method of the pulley main body 11 is as follows. The cross sectional shape of the space occupied by the weight 16b inside the hole 16a (circular shape) is roughly the same as a shape that includes the hole shape of the first opening 16α (in this embodiment, the shape of a circle with a crescent-shaped portion taken away (refer to FIG. 5)) and the hole shape of the second opening 16β (in this embodiment, a crescent-shape (refer to FIG. 6)), as shown in FIGS. 5 and 6. Hence, it is relatively easy to integrally form a wall portion 16d at both ends in the axial direction of the hole 16a. This is done by providing a convex portion for forming the first opening 16α on a metal mold half out of two mold halves having a split mold surface in a face orthogonal to the axial direction of the pulley 10 and by providing a convex portion for forming the second opening 16β on the other metal mold half.

(Second Embodiment)

Figure 9B:
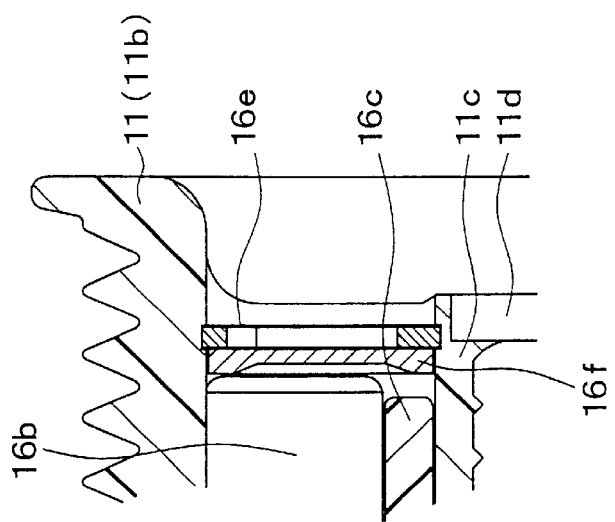
FIG. 9B is an enlarged view of encircled area 9B of FIG. 9A.
Figure 9A:
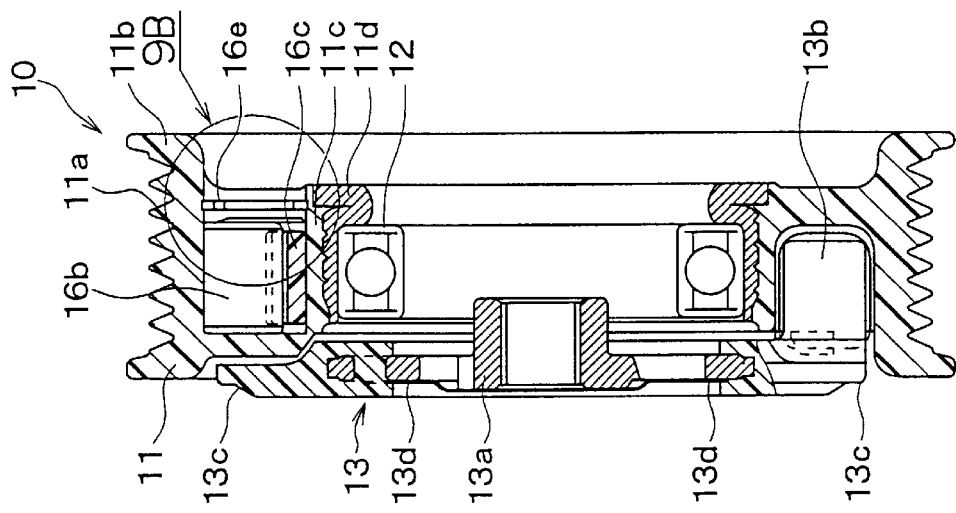
FIG. 9A is a sectional view of a pulley according to a second embodiment.
Figure 10:
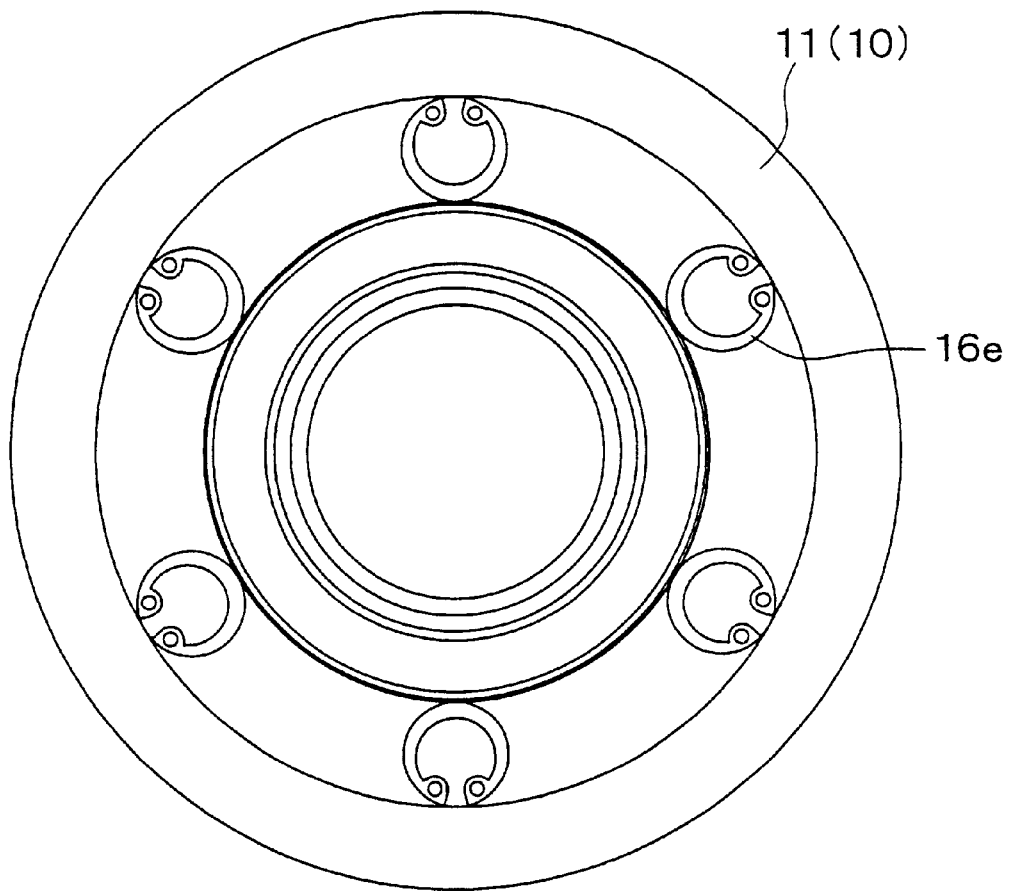
FIG. 10 is a right side view of FIG. 9A.

In the first embodiment, escape of the weight 16b from the hole 16a was prevented by the wall 16d on the side of the second opening 16β. However, in this embodiment, instead of the wall 16d on the side of the second opening 16β, escape of the weight 16b from the hole 16a is prevented by a snap ring 16e, as shown in FIGS. 9A and 9B.

A plate 16f is arranged between the weight 16b and the snap ring 16e to make the weight 16b oscillate (rotate) smoothly.

With this arrangement, the hole 16a can be formed easily from the side of the second opening 16β, by mechanical processing with a drilling machine.

(Other Embodiments)

In the illustrated embodiment, the present invention was applied to a compressor (fluid pump) 1 and a pulley 10. However, the present invention is not so limited and it can be applied to other systems.

In the above-mentioned embodiment, the damper 14 was made of EPDM. However, the present invention is not limited to EDPM, and the damper 14 can be made of other elastic members, such as metallic springs or springs made of resin.

In the illustrated embodiment, the dampers 14 were shaped to provide a non-linear response characteristic. However, the present invention is not so limited, and the dampers 14 can be made to have a shape with a linear characteristic, for example.

In the above-mentioned embodiment, the torque from the driving source was received by the pulley main body (first rotating member), and the received torque was transmitted by the center hub (second rotating member) to the rotating device (compressor 1). However, the present invention is not so limited and can have the opposite construction, such that the center hub 13 receives the torque from the driving source.

It is also possible to install a sheathing film made of a resin (such as a heat-shrinking tube made of PTFE, or a film of rubber tube, for example) on the outer surface of the weight 16b that faces the inner wall of the hole 16a. Such a sheathing film reduces noise of the weight 16b contacting the inner wall of the hole 16a.

what is claimed is:

1. A torque transmission apparatus for transmitting torque from a driving source to a rotating device, the apparatus comprising:

a first rotating member, wherein the first rotating member has a dual tubular form and includes an inner tube and an outer tube, which are coaxial, and the outer tube is connected to one of the driving source and the rotating device;

a bearing arranged within the inner tube, wherein the bearing supports the first rotating member in a rotatable manner;

a second rotating member, which is coaxial to the first rotating member, and the second rotating member is connected to the other of the driving source and the rotating device;

an elastically deformable torque transmission member arranged between the inner tube and the outer tube, for transmitting the torque between the first rotating member and the second rotating member; and a pendulum type vibration-absorbing mechanism located between the inner tube and the outer tube, for canceling an exciting force generated by rotational movement of the rotating members, wherein the mechanism includes a movable weight.

2. The torque transmission apparatus according to claim 1, wherein the weight is fitted into a hole formed between the inner tube and the outer tube such that the weight can slide within the hole, and the center of gravity of the weight is offset from the center of area of a cross section of the hole.

3. The torque transmission apparatus according to claim 2, wherein the second rotating member includes an annular portion, which includes an engaging member for engaging the torque transmission member, and the hole is blocked at an axial end by the annular portion.

4. The torque transmission apparatus according to claim 3, wherein one axial end of the hole in the first rotating member has a first opening and the opposite end of the hole has a second opening, and the cross sectional shape of the space occupied by the weight is approximately the same as a shape that is a combination of the shape of the first opening and the shape of the second opening.

5. The torque transmission apparatus according to claim 2, wherein one axial end of the hole in the first rotating member has a first opening and the opposite end of the hole has a second opening, and the cross sectional shape of the space occupied by the weight is approximately the same as a shape that is a combination of the shape of the first opening and the shape of the second opening.

6. The torque transmission apparatus according to claim 2, wherein the torque transmission member is one of a plurality of torque transmission members included in the apparatus, and the vibration absorbing mechanism is one of a plurality of vibration absorbing mechanisms included in the apparatus, and the apparatus includes escape-preventing means for preventing the weight from falling out of the hole, and the escape-preventing means is part of the torque transmission members.

7. The torque transmission apparatus according to claim 6, wherein one axial end of each hole in the first rotating member has a first opening and the opposite end of each hole has a second opening, and the cross sectional shape of the space occupied by each weight is approximately the same as a shape that is a combination of the shape of the corresponding first and second openings.

* * * * *